United States Patent [19]
Morooka

[11] Patent Number: 5,270,758
[45] Date of Patent: Dec. 14, 1993

[54] WAIST LEVEL FINDER OPTICAL SYSTEM

[75] Inventor: Masaru Morooka, Hachiouji, Japan

[73] Assignee: Olympus Optical Co., Ltd., Tokyo, Japan

[21] Appl. No.: 834,196

[22] Filed: Feb. 12, 1992

[30] Foreign Application Priority Data

Feb. 13, 1991 [JP] Japan ................................ 3-041235

[51] Int. Cl.⁵ .............................................. G03B 13/08
[52] U.S. Cl. ..................................... 354/224; 354/166; 354/201; 354/199
[58] Field of Search ............... 354/219, 224, 225, 199, 354/166, 201

[56] References Cited

U.S. PATENT DOCUMENTS

| | | |
|---|---|---|
| 2,800,052 | 7/1957 | Bechtold et al. |
| 4,842,395 | 6/1989 | Sato et al. |
| 4,957,356 | 9/1990 | Oizumi et al. |
| 5,034,763 | 7/1991 | Inabata |
| 5,034,764 | 7/1991 | Inabata |
| 5,130,855 | 7/1992 | Mukai et al. |
| 5,136,427 | 8/1992 | Sugawara |

FOREIGN PATENT DOCUMENTS

61-156018  7/1986 Japan.
63-262635 10/1988 Japan.
1-257817  10/1989 Japan.

Primary Examiner—Monroe H. Hayes
Attorney, Agent, or Firm—Cushman, Darby & Cushman

[57] ABSTRACT

A waist level finder optical system comprising, in order from the object side: an objective lens system for finder comprising a first lens unit having positive refractive power and a second lens unit having negative refractive power; a reflecting member for erecting an image of object formed by the objective lens system; and a field lens having positive refractive power. This finder optical system can have a total length as a whole which is shortened without changing a half angle of incidence, a height of a principal ray as measured on the field lens and a distance as measured from the field lens to an eye point.

15 Claims, 7 Drawing Sheets

SPHERICAL ABERRATION
F.NO = 6.38

ASTIGMATISM
ω = 11.0°

DISTORTION
ω = 11.0°
(%)

SPHERICAL ABERRATION
F.NO = 6.39

ASTIGMATISM
ω = 13.1°

DISTORTION
ω = 13.1°
(%)

WAIST LEVEL FINDER OPTICAL SYSTEM

BACKGROUND OF THE INVENTION a) Field of the Invention

The present invention relates to a waist level finder optical system which is to be used with lens shutter cameras and so on.

b) Description of the Prior Art

The conventional waist level finder optical system, typically exemplified by the waist level finder optical system proposed by Japanese Patent Preliminary Publication No. Sho 63-262635, is composed of an objective lens having positive refractive power and a field lens having positive refractive power which are arranged in order from the object side.

Figure 1:
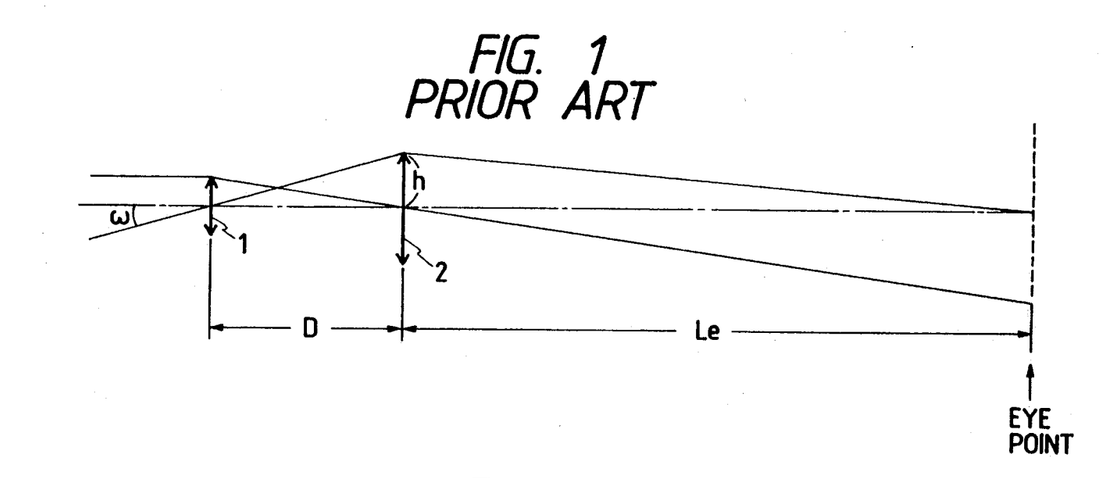
FIG. 1 is a sectional view illustrating an example of the conventional waist level finder optical system which is assumed to be composed only of thin lenses.

This conventional waist level finder optical system, i.e., an optical system which is composed of an objective lens having positive refractive power and a field lens which is arranged in the vicinity of an image point of the objective lens and has positive refractive power, will be examined according to the paraxial theory while regarding these lenses as thin lenses as illustrated in FIG. 1. In this drawing, the reference numeral 1 represents the objective lens, the reference numeral 2 designates the field lens and the following formulae apply to this optical system:

$$f_1 = D \tag{1}$$

$$1/f_1 = \tan \omega / h \tag{2}$$

$$1/f_2 = 1/Le + 1/D \tag{3}$$

wherein the reference symbol D represents a total length of the waist level finder optical system, the reference symbol $f_1$ designates a focal length of the objective lens, the reference symbol $\omega$ denotes a half angle of incidence of the waist level finder optical system, the reference symbol h represents a height, as measured on the field lens 2, of a principal ray incident at the half angle of incidence $\omega$ on the optical system, the reference symbol $f_2$ designates a focal length of the field lens and the reference symbol Le denotes a distance as measured from the field lens 2 to an eye point.

The formula (1) means that the total length of the waist level finder optical system is equal to the focal length $f_1$ of the objective lens when considered according to the paraxial theory. The formula (2) means that the focal length $f_1$ of the objective lens 1 is determined dependently on the half angle of incidence $\omega$ and the height h of the principal ray. The formula (3) means that the focal length $f_2$ of the field lens 2 is determined dependently on the distance Le and the total length D of the finder optical system. Accordingly, it is apparent from the above-mentioned formulae (1) and (2) that the total length D of the waist level finder optical system is determined once the half angle of incidence $\omega$ of the waist level finder optical system and the height of ray on the field lens 2 are decided.

In order to shorten the total length D of the waist level finder optical system with the half angle of incidence $\omega$ kept definite, however, it is obliged to lower the height h of the principal ray on the field lens 2, or reduce size of an image. As a result, the waist level finder optical system has a long distance as measured from the field lens to the eye point, thereby being inconvenient for observation of the image.

SUMMARY OF THE INVENTION

In view of the problem described above, it is a primary object of the present invention to provide a compact waist level finder optical system which can have a shortened total length without changing any one of the half angle of incidence, the height of the principal ray on the field lens and the distance as measured from the field lens to the eye point.

In order to attain the object mentioned above, the waist level finder optical system according to the present invention comprises, in order from the object side, an objective lens system for finder which comprises a first lens unit having positive refractive power and a second lens unit having negative refractive power, a reflecting member for erecting an image of object formed by the objective lens system for finder, and a field lens having positive refractive power.

Figure 2:
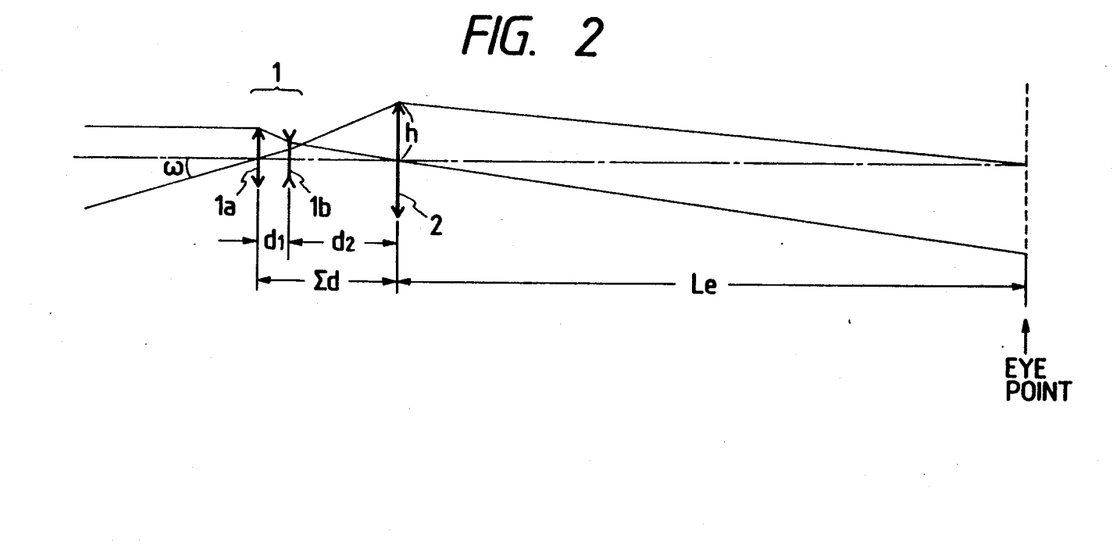
FIG. 2 is a sectional view illustrating the waist level finder optical system according to the present invention which is assumed to be composed only of thin lenses.

FIG. 2 shows the waist level finder optical system according to the present invention which is considered as it is composed of thin lenses and to which the following formulae apply:

$$1/f_{1F} = 1/f_1\{(f_1 - d_2)/d_1\} \tag{4}$$

$$1/f_{1R} = 1/d_2\{1 - (f_1 - d_2)/d_1\} \tag{5}$$

$$1/f_2 = 1/Le + 1/\Sigma d \tag{6}$$

wherein the reference symbol $f_1$ represents a focal length of the objective lens system 1, the reference symbol $f_{1a}$ designates a focal length of the first lens unit 1a, the reference symbol $f_{1b}$ denotes a focal length of the second lens unit 1b, the reference symbol $f_2$ represents a focal length of the field lens 2, the reference symbol d designates a distance as measured from the first lens unit 1a to the second lens unit 1b, the reference symbol $d_2$ denotes a distance as measured from the second lens unit 1b to the field lens 2, the reference symbol $\Sigma d$ represents a total of $d_1 + d_2$ and the reference symbol Le designates a distance as measured from the field lens 2 to an eye point.

The formulae (4) and (5) mean that each of the focal length $f_{1F}$ of the first lens unit 1a and the focal length $f_{1R}$ of the second lens unit 1b is determined dependently on the focal length $f_1$ of the objective lens system 1, the distance $d_1$ and the distance $d_2$ according to the paraxial theory. Further, the formula (6) means that the focal length $f_2$ of the field lens is determined dependently on the distance Le and the distance $\Sigma d$ according to the paraxial theory. It is therefore apparent from the formulae (4), (5) and (6) that the focal length of each of the lens units of the waist level finder optical system is determined by deciding the focal length $f_1$ of the objective lens system 1, the distance $d_1$ as measured from the first lens unit 1a to the second lens unit 1b, the distance $d_2$ as measured from the second lens unit 1b to the field lens 2 and the distance Le as measured from the field lens 2 to the eye point.

Furthermore, since $f_{1R}$ is smaller than 0, it is clear from the formula (5) that $(d_1 - f + d_2)$ is smaller than 0, i.e., $\Sigma d$ is shorter than $f_1$. Since $f_1$ used in the formula (5) equivalent to $f_1$ used in the formula (1), $\Sigma d$ is shorter than D.

Consequently, it is possible, as judged from the formulae (4), (5) and (6) mentioned above, to configure the waist level finder optical system so as to have a total length or a size which is shorter or smaller than that of the conventional waist level finder optical system even when these optical systems are specified for the same half angle of incidence, height of the principal ray on the field lens 2 and distance as measured from the field lens 2 to the eye point.

In order to obtain favorable optical performance of the waist level finder optical system according to the present invention, it is desirable to configure the optical system so as to satisfy the following conditions (7) and (8):

$$0.2 < f_{1F}/f_1 < 0.5 \tag{7}$$

$$0.25 < |f_{1R}/e| < 1.0 \tag{8}$$

wherein the reference symbol e represents a distance as measured from a rear principal point of the second lens unit $1b$ to a front pricipal point of the field lens 2.

If the lower limit of the condition (7) is exceeded, the first lens unit $1a$ will have strong power which is advantageous for shortening the total length of the finder optical system but variations of aberrations, especially those of spherical aberration and coma, will be too remarkable for correction. If the upper limit of the condition (7) is exceeded, in contrast, the first lens unit $1a$ will have weak power, thereby making it difficult to shorten the total length of the finder optical system.

If the lower limit of the condition (8) is exceeded, the second lens unit $1b$ will have strong power which is advantageous for shortening the total length of the finder optical system but variations of aberrations, especially those of spherical aberration and coma, will be too remarkable for correction. If the upper limit of the condition (8) is exceeded, in contrast, the second lens unit $1b$ will have weak power, thereby making it difficult to shorten the total length of the finder optical system.

Moreover, in an actual waist level finder optical system, the objective lens system 1 has an optical axis which is in parallel with an optical axis of a photographic lens system and a reflecting member is arranged ordinarily between the objective lens system 1 and the field lens 2 for allowing to observe from above an image formed by the objective lens system. In the waist level finder optical system according to the present invention, a mirror having a roof surface or a prism having a roof surface is used as this reflecting member. This prism may be integrated with the objective lens system 1 or the field lens 2.

In addition, usable as the field lens 2 is a Fresnel lens or a holographic optical element (hereinafter abbreviated as HOE). Use of the Fresnel lens or HOE makes it possible to thin the field lens 2, thereby making the waist level finder optical system further compacter. HOE is an optical element which has recently been put into practical use and utilizable as a lens, mirror or a light beam splitting prism by utilizing a diffracting function of a hologram. HOE permits preparing a replica thereof by using a resin such as a plastic material at a low cost and has a simple structure.

The waist level finder optical system according to the present invention is usable not only as an attachment optical system which is to be attached to an eye level finder but also as an independent waist level finder.

In a favorable formation of the present invention, the waist level finder optical system comprises a photographic lens system which is arranged on the object side of the objective lens system for finder.

In another favorable formation of the present invention, the waist level finder optical system is used as an attachment optical system which is to be attached to a finder system of a camera.

This and other objects as well as the features and the advantages of the present invention will become apparent from the following detailed description of the preferred embodiments when taken in conjunction with the accompanying drawings.

DESCRIPTION OF THE PREFERRED EMBODIMENTS

Now, the waist level finder optical system according to the present invention will be described more detailedly below with reference to the preferred embodiments illustrated in the accompanying drawings.

First Embodiment

Figure 3:
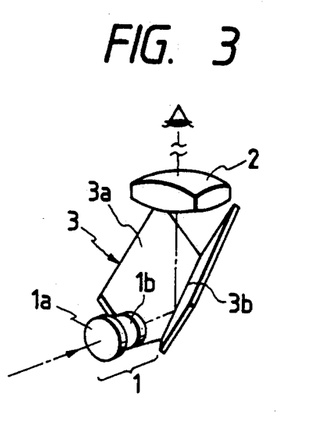
FIG. 3 is a perspective view illustrating a first embodiment of the waist level finder optical system according to the present invention.
Figure 4:
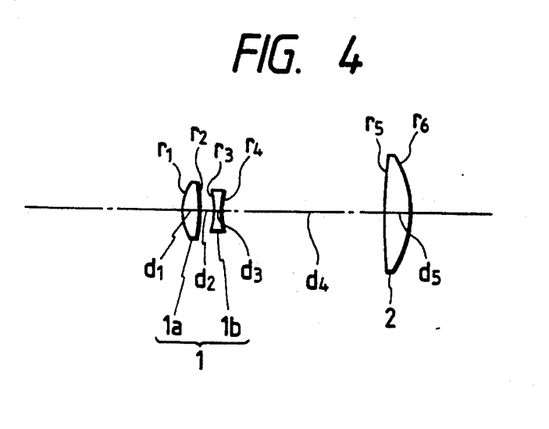
FIG. 4 is a expansion plan of the first embodiment of the present invention.

FIG. 3 and FIG. 4 are a perspective view and an expansion plan respectively showing the first embodiment of the present invention. In FIG. 4, a reflecting surface is not shown. In these drawings, the reference numeral 1 represents an objective lens system which consists of a first lens unit 1a having positive refractive power and a second lens unit having negative refractive power, and has positive refractive power as a whole. The reference numeral 3 designates a roof mirror which is used for leading a light bundle from the objective lens system 1 to a waist level and has a roof surface 3a having an edge line 3b inclined 45° relative to an optical axis of the objective lens system 1. The reference numeral 2 denotes a field lens arranged in the vicinity of an image point of the objective lens system 1.

In the first embodiment, a light bundle which has passed through the objective lens system 1 for forming an image in a visual field is reflected by the roof surface 3a of the roof mirror 3 so as to invert the image in the horizontal direction and direct 90° upward so as to form an erect image in the vicinity of the field lens 2, and then condensed efficiently by the field lens 2 onto an eye point which is located at a distance of 250mm from the field lens 2.

Figure 5:
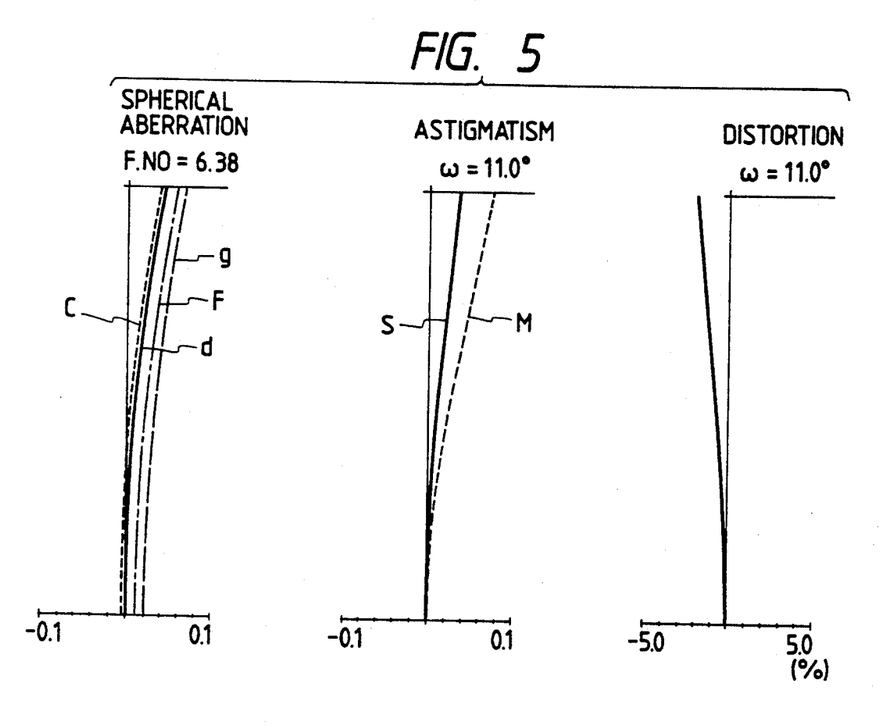
FIG. 5 shows curves illustrating aberration characteristics of the first embodiment of the present invention.

The first embodiment has the numerical data listed below and the aberration characteristics illustrated in FIG. 5.

Distance from field lens to eye point = 250 mm, $2\omega = 22.07°$,
$f_{1F}/f_1 = 0.30$, $|f_{1R}/e| = 0.43$

| | | |
|---|---|---|
| $\gamma_1 = 8.0000$ | | |
| $d_1 = 2.6000$ | $n_1 = 1.49260$ | $\nu_1 = 58.02$ |
| $\gamma_2 = -25.5826$ | | |
| $d_2 = 2.2429$ | | |
| $\gamma_3 = -12.4311$ | | |
| $d_3 = 1.2000$ | $n_2 = 1.49260$ | $\nu_2 = 58.02$ |
| $\gamma_4 = 12.4311$ | | |
| $d_4 = 25.8905$ | | |
| $\gamma_5 = 110.0000$ | | |
| $d_5 = 4.0000$ | $n_3 = 1.49260$ | $\nu_3 = 58.02$ |
| $\gamma_6 = -16.7012$ | | |

Second Embodiment

Figure 6:
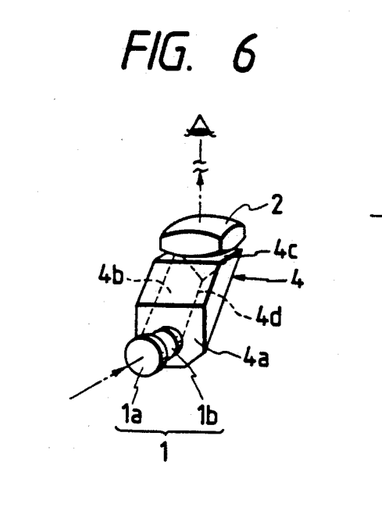
FIG. 6 is a perspective view illustrating a second embodiment of the waist level finder optical system according to the present invention.
Figure 7:
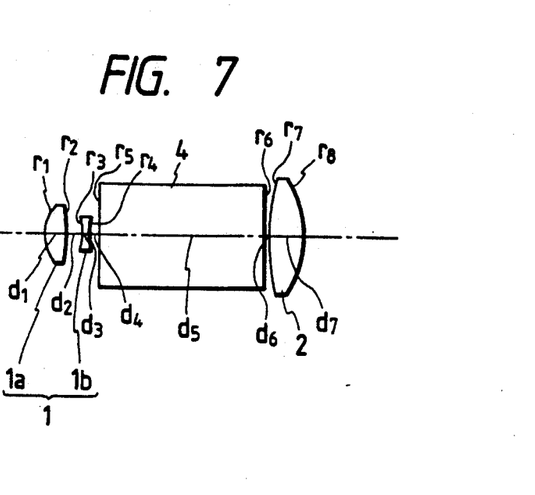
FIG. 7 is an expansion plan of the second embodiment of the present invention.

FIG. 6 and FIG. 7 are a perspective view and an expansion plan respectively illustrating the second embodiment of the present invention. A reflecting surface is not shown in FIG. 7. In these drawings, the reference numeral 1 represents an objective lens system which consists of a first lens unit 1a having positive refractive power and a second lens unit 1b having negative refractive power, and has positive refractive power as a whole. The reference numeral 4 designates a roof prism which is used for leading a light bundle from the objective lens system 1 to a waist level, and has a surface of incidence 4a perpendicular to an optical axis of the objective lens system 1, a roof surface 4b and a surface of emergence 4c perpendicular to an optical axis of a field lens 2 to be described later. The roof surface 4b has an edge line 4d which is inclined 45° relative to the optical axis of the objective lens system 1. The reference numeral 2 denotes a field lens which is arranged in the vicinity of an image point of the objective lens system 1 and has positive refractive power.

In the second embodiment, a light bundle which has passed through the objective lens system 1 for forming an image in a visual field is reflected by the roof surface 4b of the roof prism 4 for inverting the image in the horizontal direction and direct 90° upward for forming an erect image in the vicinity of the field lens 2, and then condensed effectively by the field lens 2 onto an eye point located at a distance of 250mm from the field lens 2.

Figure 8:
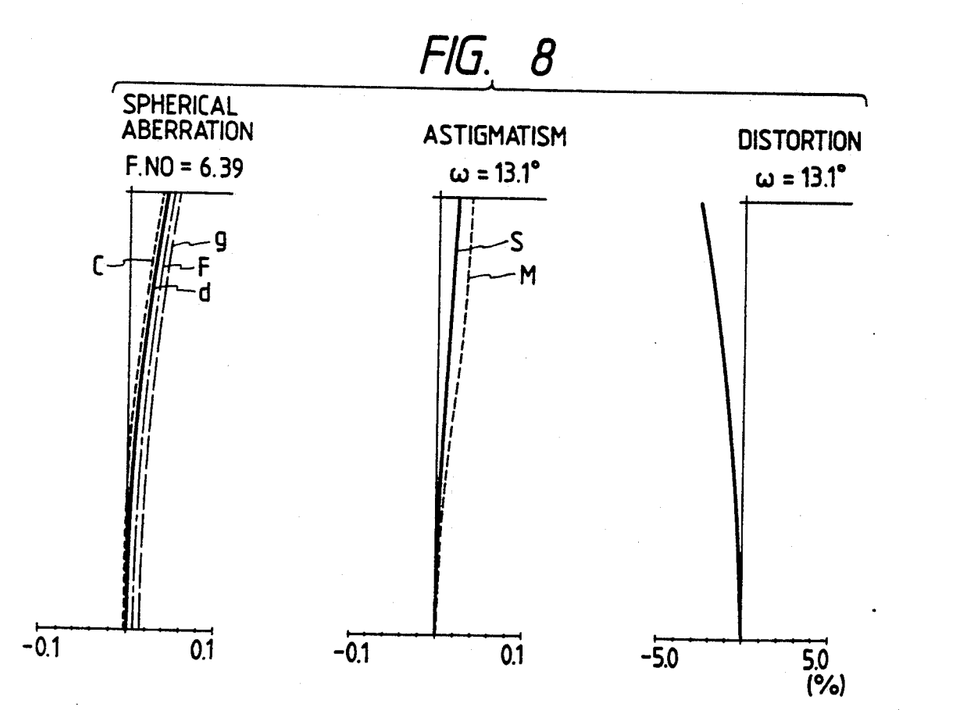
FIG. 8 shows curves illustrating aberration characteristics of the second embodiment of the present invention.

The second embodiment is designed with the numerical data listed below and has the aberration characteristics illustrated in FIG. 8.

Distance from field lens to eye point = 250 mm, $2\omega = 26.17°$,
$f_{1F}/f_1 = 0.36$, $|f_{1R}/e| = 0.41$

| | | |
|---|---|---|
| $\gamma_1 = 7.3021$ | | |
| $d_1 = 3.0000$ | $n_1 = 1.49260$ | $\nu_1 = 58.02$ |
| $\gamma_2 = -46.6161$ | | |
| $d_2 = 2.6938$ | | |
| $\gamma_3 = -17.5877$ | | |
| $d_3 = 1.2000$ | $n_2 = 1.49260$ | $\nu_2 = 58.02$ |
| $\gamma_4 = 9.7574$ | | |
| $d_4 = 1.0000$ | | |
| $\gamma_5 = \infty$ | | |
| $d_5 = 26.0000$ | $n_3 = 1.49260$ | $\nu_3 = 58.02$ |
| $\gamma_6 = \infty$ | | |
| $d_6 = 0.5000$ | | |
| $\gamma_7 = 46.5518$ | | |
| $d_7 = 5.0000$ | $n_4 = 1.49260$ | $\nu_4 = 58.02$ |
| $\gamma_8 = -15.2852$ | | |

Figure 9:
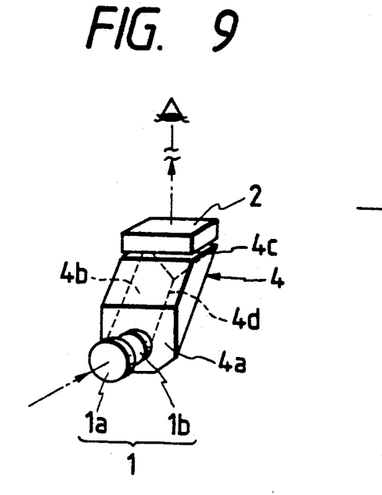
FIG. 9 is a perspective view illustrating a modification example of the second embodiment of the present invention.
Figure 10:
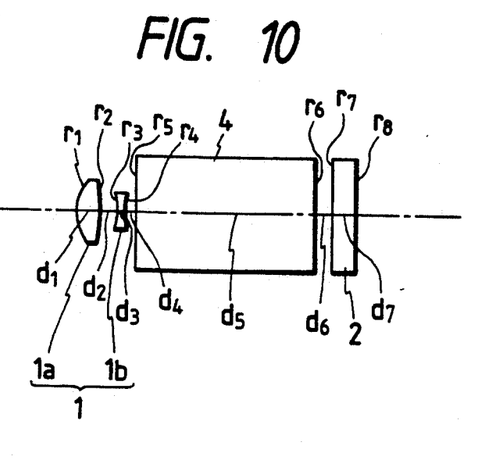
FIG. 10 is an expansion plan of the modification example shown in FIG. 9.

Though the lens having curvature on both a surface of incidence and a surface of emergence thereof is used as the field lens 2 in the second embodiment, a Fresnel lens, a holographic lens, a distributed index of refraction type lens or the similar lens may be used as the field lens 2 as shown in FIG. 9 and FIG. 10. In the latter case, the field lens has planar surfaces and facilitates assembly of the optical system.

Third Embodiment

Figure 11:
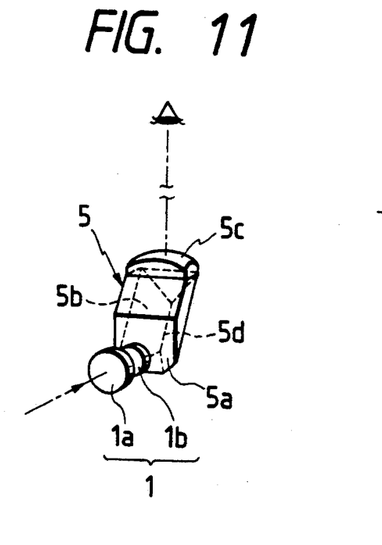
FIG. 11 is a perspective view illustrating a third embodiment of the waist level finder optical system according to the present invention.
Figure 12:
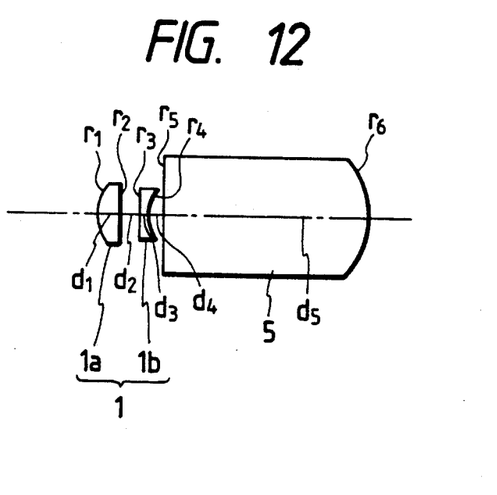
FIG. 12 is an expansion plan of the third embodiment of the present invention.

FIG. 11 and FIG. 12 are a perspective view and an expansion plan respectively illustrating the third embodiment of the present invention. A reflecting surface is not shown in FIG. 12. The roof prism 4 and the field lens 2 which are used in the second embodiment are integrated with each other in the third embodiment. That is to say, a prism 5 having curvature on a surface of emergence 5c is adopted for the third embodiment.

Figure 13:
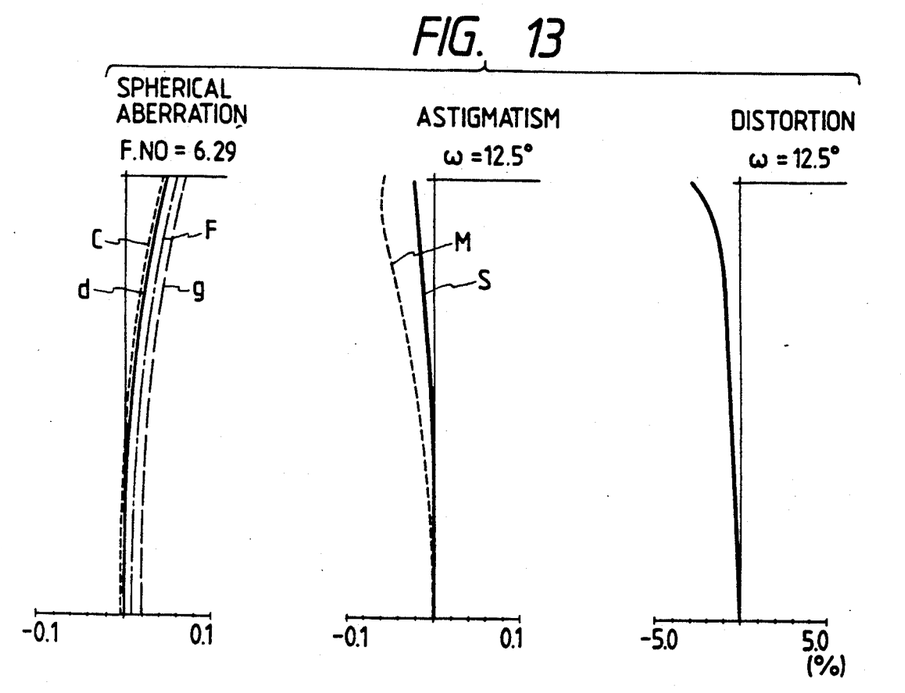
FIG. 13 shows curves illustrating aberration characteristics of the third embodiment of the present invention.
Figure 14:
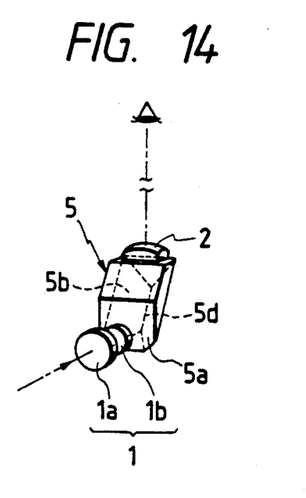
FIG. 14 is a perspective view illustrating a modification example of the third embodiment of the present invention.
Figure 15:
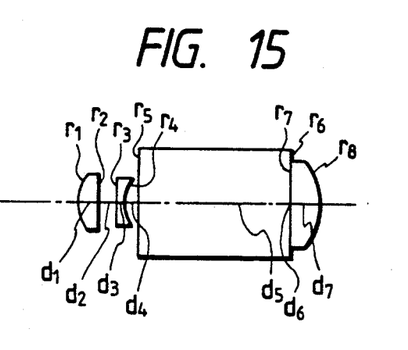
FIG. 15 is an expansion plan of the modification example shown in FIG. 14.

The third embodiment has the numerical data listed below and the aberration characteristics visualized in FIG. 13.

Distance from field lens to eye point = 250 mm, $2\omega = 25.04°$,
$f_{1F}f_1 = 0.37$, $|f_{1R}/e| = 0.58$

| | | |
|---|---|---|
| $\gamma_1 = 6.6611$ | | |
| $d_1 = 3.0000$ | $n_1 = 1.49260$ | $\nu_1 = 58.02$ |
| $\gamma_2 = 769.0945$ | | |
| $d_2 = 2.8792$ | | |
| $\gamma_3 = 71.9588$ | | |
| $d_3 = 1.2000$ | $n_2 = 1.49260$ | $\nu_2 = 58.02$ |
| $\gamma_4 = 5.5953$ (Aspherical surface) | | |
| $d_4 = 2.0000$ | | |
| $\gamma_5 = \infty$ | | |
| $d_5 = 29.0000$ | $n_3 = 1.49260$ | $\nu_3 = 58.02$ |
| $\gamma_6 = -11.4776$ (Aspherical surface) | | |

| Aspherical coefficients | |
|---|---|
| Fourth surface | $E = 0.11479 \times 10^{-2}$ |
| Sixth surface | $E = 0.86028 \times 10^{-4}$ |

Though the prism 5 is formed as an integral member which has the curvature on the surface of emergence 5c thereof is used in the third embodiment, it is allowed for facilitating manufacturing of the optical system to prepare the prism 5 and the field lens 2 separately, and cement these members to each other.

Fourth Embodiment

Figure 16:
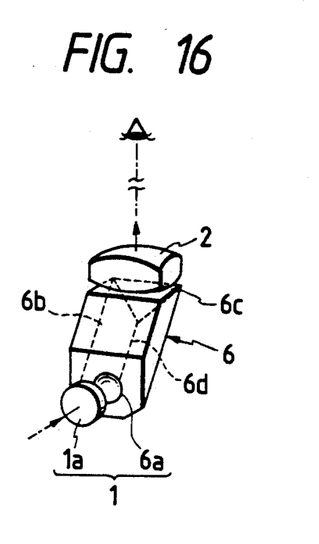
FIG. 16 is a perspective view illustrating a fourth embodiment of the waist level finder optical system according to the present invention.
Figure 17:
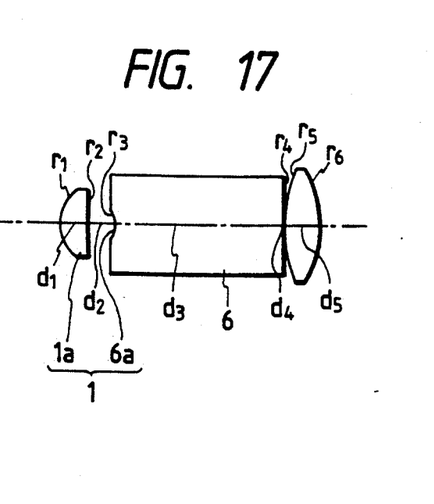
FIG. 17 is an expansion plan of the fourth embodiment of the present invention.

The fourth embodiment of the present invention is illustrated in the perspective view and the expansion plan shown in FIG. 16 and FIG. 17 respectively. A reflecting surface is not shown in the expansion plan. The second lens unit 1b and the roof prism 4 which are used in the second embodiment are integrated with each other in the fourth embodiment. That is to say, the fourth embodiment adopts a prism 6 which has curvature on a surface of incidence 6a.

Figure 18:
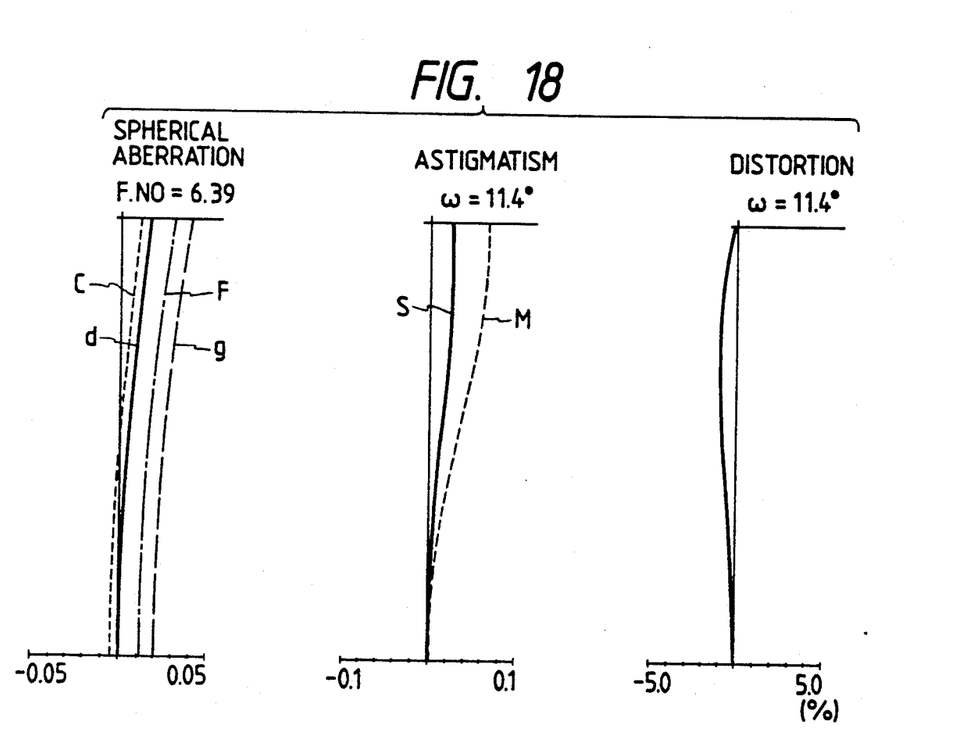
FIG. 18 shows curves illustrating aberration characteristics of the fourth embodiment of the present invention.
Figure 19:
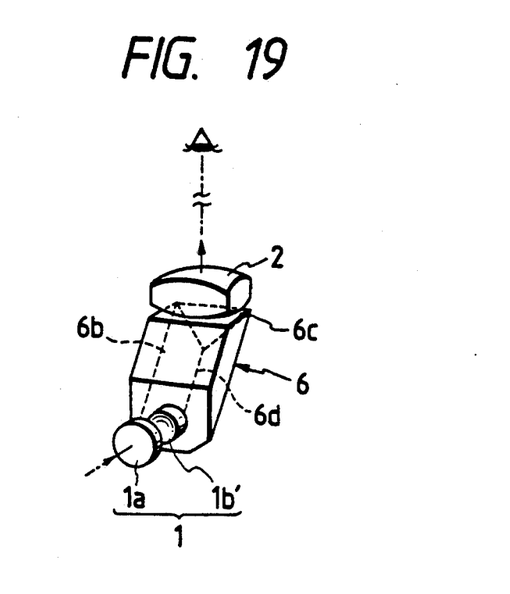
FIG. 19 is a perspective view illustrating a modification example of the fourth embodiment of the present invention.
Figure 20:
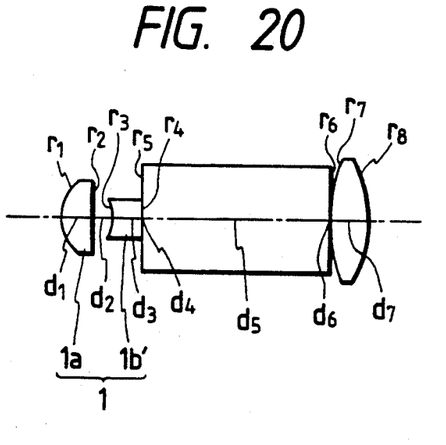
FIG. 20 is an expansion plan of the modification example shown in FIG. 19.

The fourth embodiment is designed with the numerical data listed below and the aberration characteristics shown in FIG. 18.

Distance from field lens to eye point = 250 mm, 2 ω = 22.79°, $f_{1F}/f_1 = 0.34$, $|f_{1R}/e| = 0.55$

| | | |
|---|---|---|
| $\gamma_1 = 6.3000$ | | |
| $d_1 = 4.2000$ | $n_1 = 1.49260$ | $\nu_1 = 58.02$ |
| $\gamma_2 = -44.1741$ | | |
| $d_2 = 3.8413$ | | |
| $\gamma_3 = -5.5091$ | | |
| $d_3 = 26.1359$ | $n_2 = 1.49260$ | $\nu_2 = 58.02$ |
| $\gamma_4 = \infty$ | | |
| $d_4 = 0.5000$ | | |
| $\gamma_5 = 28.000$ | | |
| $d_5 = 5.2000$ | $n_3 = 1.49260$ | $\nu_3 = 58.02$ |
| $\gamma_6 = -18.6134$ | | |

Though the fourth embodiment adopts the prism 6 which is formed as an integral member having curvature on the surface of incidence 6a, it is allowed for facilitating manufacturing of the optical system to separately prepare the prism 6 and a concave lens 1b' to be used as the second lens unit, and cementing these members to each other.

In the numerical data listed above, the reference symbols $\gamma_1, \gamma_2, ...$ represent radii of curvature on respective lens elements, the reference symbols $d_1, d_2, ...$ designate thicknesses of the respective lens elements and airspaces reserved therebetween, the reference symbols $n_1, n_2, ...$ denote refractive indices of the respective lens elements, and the reference symbols $\nu_1, \nu_2, ...$ represent Abbe's numbers of the respective lens elements. Further, the aberration characteristics of each embodiment are traced on the basis of values expressed in terms of diopter.

Moreover, shapes of the aspherical surfaces used in the embodiments described above are expressed by the following formula by using the aspherical coefficients mentioned above:

$$X = CH^2/\{1 + (1 - PC^2 Y^2)^{1/2}\} + EY^4$$

wherein a direction of the optical axis is taken as the ordinate, a direction perpendicular to the optical axis is taken as the abscissa and the reference symbol C represents curvature ($= 1/\gamma$) as measured on a vertex of an aspherical surface.

In addition, the embodiments are described above on a premise that optical elements used in the objective lens system are to be made of plastic materials, but these elements may be fabricated with glass materials so far as these materials are sufficiently payable.

What is claimed is:

1. A waist level finder optical system comprising, in order from the object side:
   an objective lens system including a positive lens unit and a negative lens unit,
   a reflecting member for erecting an image of an object formed by said objective lens system to bend an optical axis toward a waist level, and
   a field lens having a positive power disposed on the optical axis bent towards the waist level by said reflecting member,
   wherein said optical system satisfies the condition $$0.2 < f_{1F}/f_1 < 0.5$$

wherein $f_{1F}$ is the focal length of said positive lens unit and $f_1$ is the focal length of said objective lens system.

2. A waist level finder optical system according to claim 1, satisfying the following condition:

$$0.25 < |f_{1R}/e| < 1.0$$

wherein $f_{1R}$ is the focal length of said negative lens unit and e is the distance from a rear principal point of said negative lens unit to a front principal point of said field lens.

3. A waist level finder optical system according to claim 1 wherein said reflecting member has a roof surface.

4. A waist level finder optical system according to claim 1 or 3 wherein said reflecting member comprises a mirror.

5. A waist level finder optical system according to claim 1 or 3 wherein said reflecting member comprises a prism.

6. A waist level finder optical system according to claim 5, wherein said negative lens unit is cemented to a surface of incidence of said reflecting member.

7. A waist level finder optical system according to claim 5, wherein said negative lens unit is integral with a surface of incidence of said reflecting member.

8. A waist level finder optical system according to claim 5, wherein said field lens is cemented to a surface of emergency of said reflecting member.

9. A waist level finder optical system according to claim 5, wherein said field lens is integral with a surface of emergence of said reflecting member.

10. A waist level finder optical system according to claim 1 or 3 wherein said negative lens unit is cemented to a surface of incidence of said reflecting member.

11. A waist level finder optical system according to claim 1 or 3 wherein said negative lens unit is integrated with a surface of incidence of said reflecting member.

12. A waist level finder optical system according to claim 1 or 3 wherein said field lens is cemented to a surface of emergence of said reflecting member.

13. A waist level finder optical system according to claim 1 or 3 wherein said field lens is integrated with a surface of emergence of said reflecting member.

14. A waist level finder optical system of an attachment type mounted behind a finder system for a camera, comprising, in order from the camera,
   an objective lens system including a positive lens unit and a negative lens unit;
   A reflecting member for erecting a finder image of said camera formed by said objective lens system to bend an optical axis toward a waist level; and
   a field lens having a positive power, disposed on the optical axis bend toward the waist level by said reflecting member, wherein said optical system satisfies the following condition:

$$0.2 < f_{1F}/f_1 < 0.5$$

where f1F is a focal length of said positive lens unit and f1 is a focal length of said objective lens system.

15. a waist level finder optical system according to claim 14, satisfying the following condition:

$$0.25 < |f_{1R}/e| < 1.0$$

where $f_{1R}$ is the focal length of said negative lens unit and e is the distance from a rear principal point of said negative lens unit to a front principal point of said field lens.

* * * * *